(12) United States Patent
Miller et al.

(10) Patent No.: US 6,530,563 B1
(45) Date of Patent: Mar. 11, 2003

(54) MULTI-AXIS SHOCK AND VIBRATION ISOLATION SYSTEM

(75) Inventors: Thomas Joseph Miller, Clarence, NY (US); Daniel Charles Radice, Eden, NY (US)

(73) Assignee: Enidine, Incorporated, Orchard Park, NY (US)

( * ) Notice: Subject to any disclaimer, the term of this patent is extended or adjusted under 35 U.S.C. 154(b) by 0 days.

(21) Appl. No.: 09/902,189

(22) Filed: Jul. 10, 2001

(51) Int. Cl.[7] ............................................... F16M 11/00
(52) U.S. Cl. ..................... 267/136; 188/378; 188/379; 188/380; 248/622
(58) Field of Search .............................. 267/140.4, 136, 267/160, 148; 158/378, 379, 380; 248/622, 631, 611, 581, 613, 438, 570

(56) References Cited

U.S. PATENT DOCUMENTS

| | | | | |
|---|---|---|---|---|
| 3,204,911 A | * | 9/1965 | Lawrence et al. | 248/611 |
| 3,754,803 A | * | 8/1973 | Underwood et al. | 312/31 |
| 4,093,072 A | * | 6/1978 | Black, Jr. | 206/521 |
| 4,190,227 A | * | 2/1980 | Belfield et al. | 248/636 |
| 4,766,708 A | * | 8/1988 | Sing | 248/585 |
| 4,978,320 A | * | 12/1990 | Chaplin et al. | 440/52 |
| 5,207,081 A | * | 5/1993 | Fuse | 68/23.1 |
| 5,374,012 A | * | 12/1994 | Marchand et al. | 244/118.1 |
| 5,549,285 A | * | 8/1996 | Collins | 267/148 |
| 6,098,966 A | | 8/2000 | Latvis, Jr. et al. | 267/34 |

* cited by examiner

Primary Examiner—Jack Lavinder
Assistant Examiner—Mariano Sy
(74) Attorney, Agent, or Firm—Wall Marjama & Bilinski LLP

(57) ABSTRACT

A shock and vibration isolator system that includes a frame in which a shock and vibration sensitive mass is suspended by double acting shock absorbers with vibration isolation capabilities. Wire rope isolators are also mounted between walls of the mass and adjacent walls of the frame so that shock and vibrations moving along the vertical, horizontal and longitudinal axes of the system are effectively attenuated.

10 Claims, 5 Drawing Sheets

MULTI-AXIS SHOCK AND VIBRATION ISOLATION SYSTEM

FIELD OF THE INVENTION

This invention relates generally to a shock and vibration isolation system, and specifically to a system for attenuating shocks and vibrations acting along the vertical, horizontal and longitudinal axes of a mass.

BACKGROUND OF THE INVENTION

Many of today's devices, such as computers and other sensitive pieces of equipment utilize shock and vibration sensitive components, the function of which can be disturbed by relatively high shock and vibration forces. Shock and vibration forces such as those created by a seismic occurrence and other similar type events are random in nature and can act upon a mass along multiple axes. Most shock and vibration absorbers can only attenuate forces acting along one axis. As a result, systems for isolating a mass from shock and vibratory forces acting along the three principle axes of the mass are typically complex, space consuming, and expensive to install and maintain.

SUMMARY OF THE INVENTION

It is therefore a primary object of the present invention to improve shock and vibration isolation systems.

It is a further object of the present invention to protect shock and vibration sensitive equipment from randomly acting shock and vibratory forces.

A still further object of the present invention is to provide an improved shock and vibration isolation system that can attenuate shock and vibratory forces acting along the three primary axes of a mass.

Another object of the present invention is to reduce the number of parts required in a shock and vibration isolation system that is adapted to attenuate random shock and vibratory force.

Yet another object of the present invention is to increase the operational life of a shock and vibration isolation system.

These and other objects of the present invention are attained by a multi-axis shock and vibration isolation system that includes a stationary frame that has intersecting vertical, horizontal, and longitudinal axes. A shock and vibration sensitive mass is suspended within the frame by a series of double acting shock absorbers that are arranged to attenuate shock and vibration moving along the vertical axis. Wire rope isolators are mounted between sidewalls of the mass and adjacent sidewalls of the frame so that they act in unison to attenuate shock and vibrations acting along the horizontal and longitudinal axes of the system.

BRIEF DESCRIPTION OF THE DRAWING

For a further understanding of these and other objects of the invention, reference will be made to the following detailed description of the invention which is to be read in association with the accompanying drawing, wherein.

DETAILED DESCRIPTION OF THE INVENTION

Figure 1:
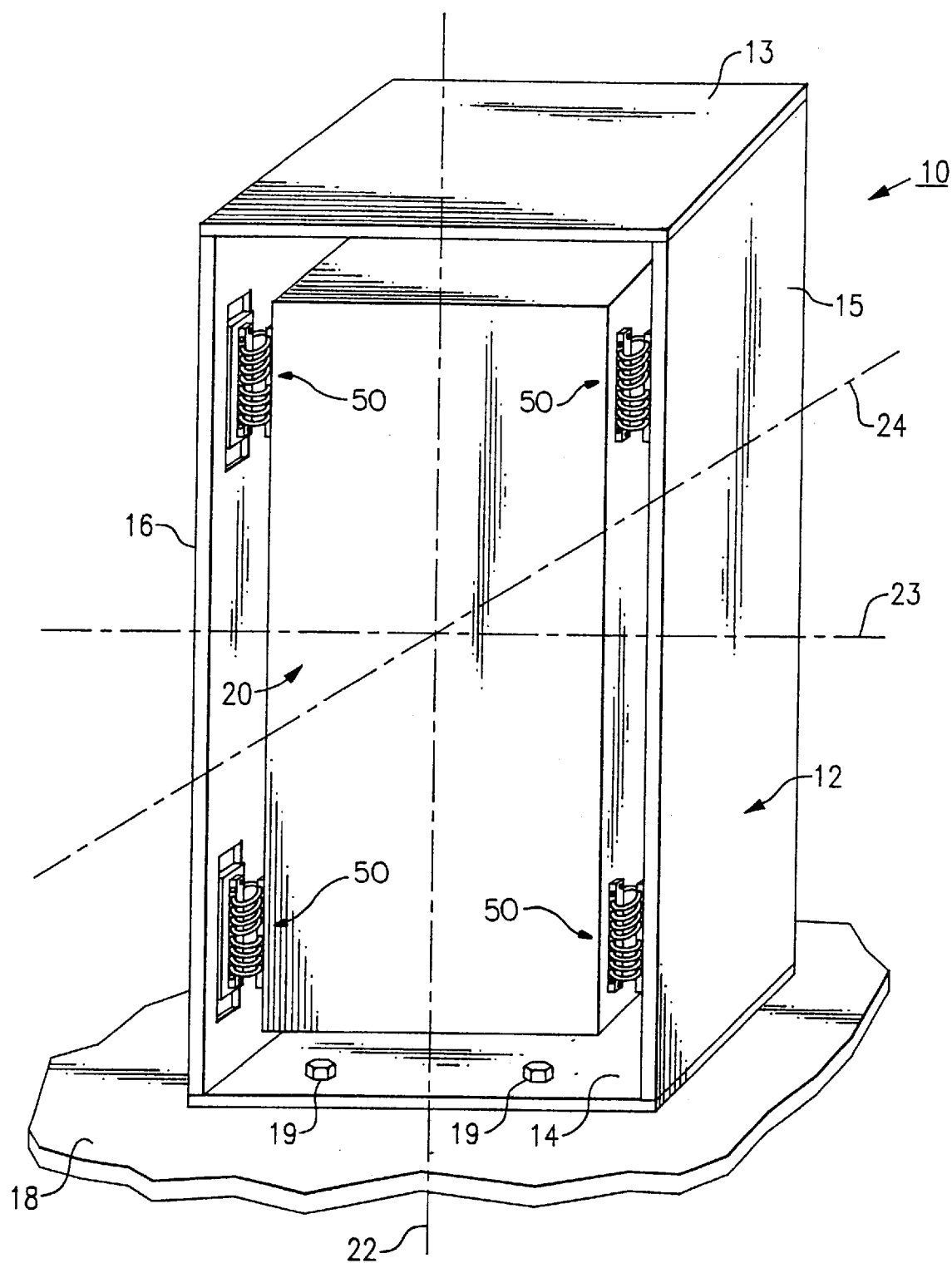
FIG. 1 is a perspective view showing a shock and vibration isolation system embodying the teachings of the present invention.
Figure 2:
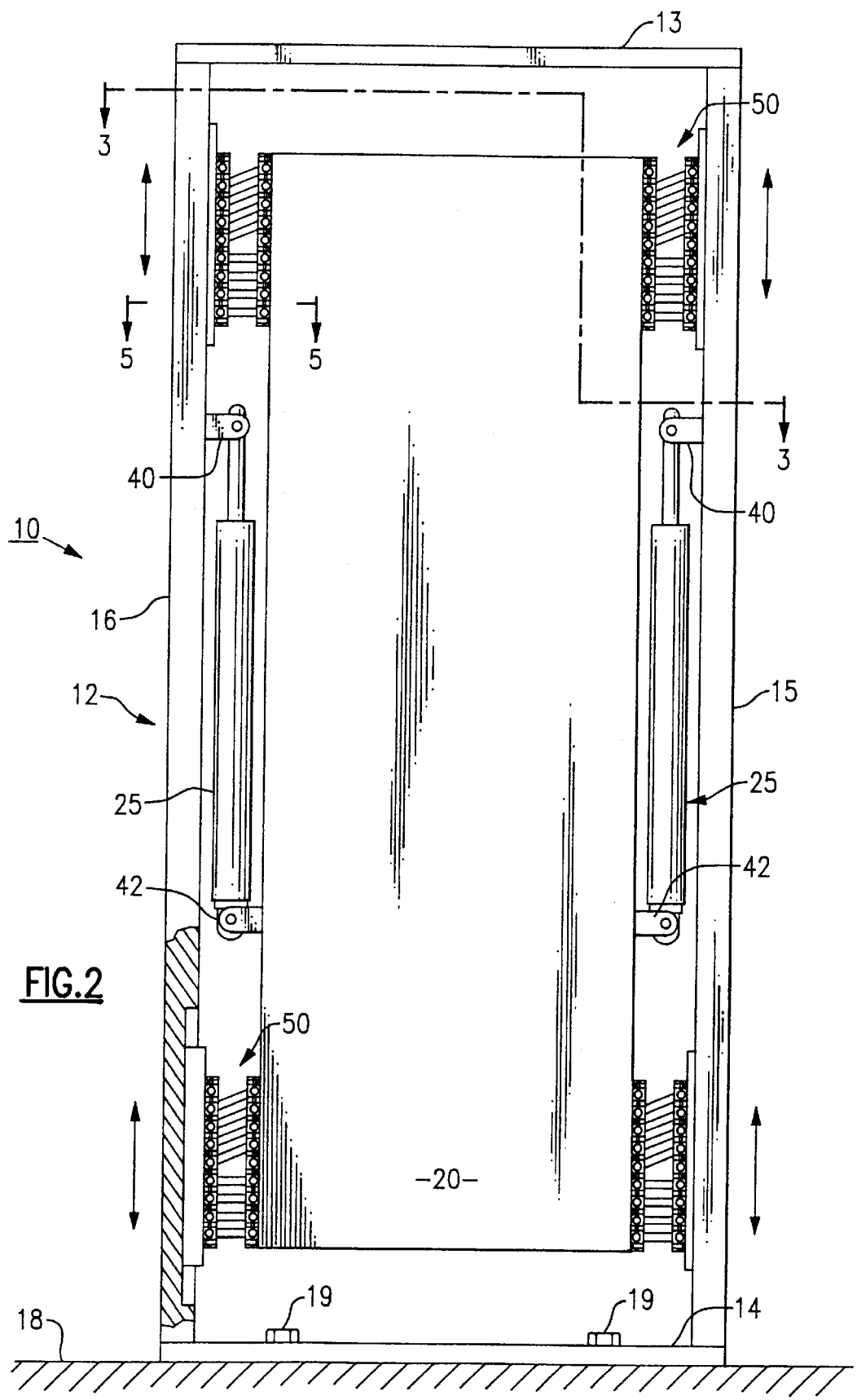
FIG. 2. is an enlarged front view of the isolation system shown in FIG. 1.
Figure 3:
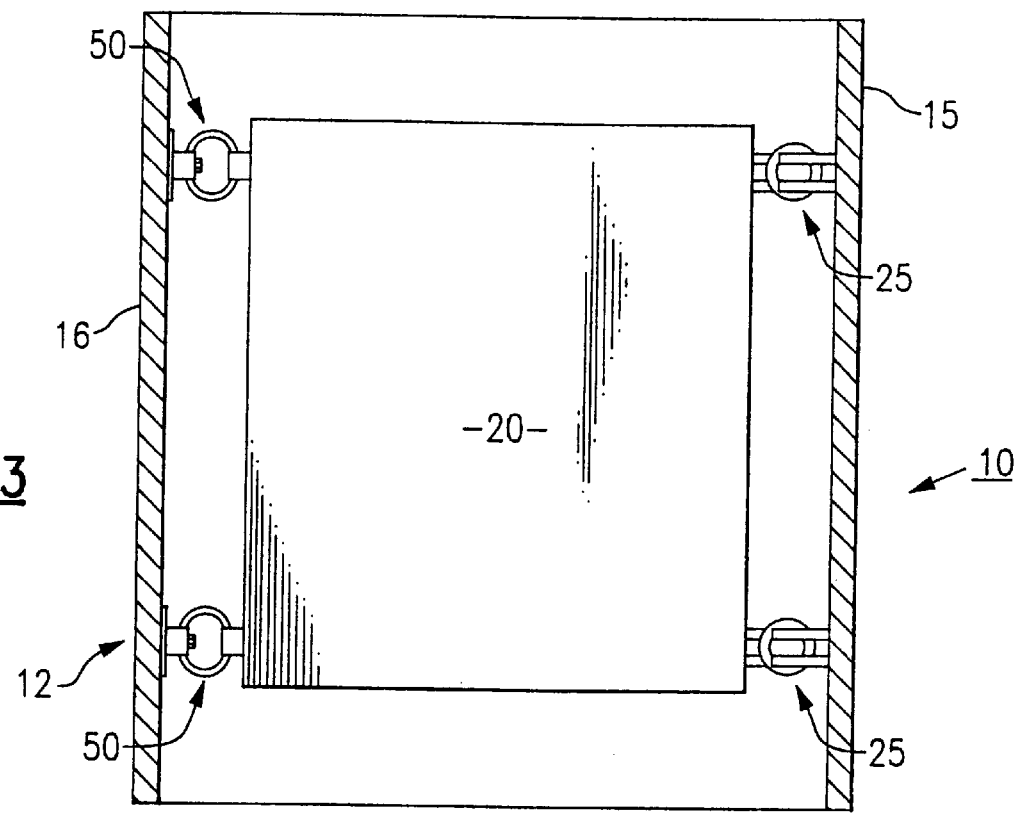
FIG. 3 is a sectional view taken along lines 3—3 in FIG. 2.

Turning initially to FIGS. 1 and 2, there is illustrated a shock and vibration isolation system, generally referenced 10 that includes a rectangular shaped frame 12 having a top wall 13, a bottom wall 14, and a pair of opposed side walls 15 and 16. As will be explained in greater detail below, a mass 20 in the form of a shock and vibration sensitive piece of equipment, such as a computer or the like, is suspended within the frame so that it is afforded three degrees of motion along a vertical axis 22, a horizontal axis 23 and a longitudinal axis 24. The bottom wall of the frame is anchored to a substrate 18 by anchor bolts 19.

As further illustrated in FIG. 2, the mass 20 is hung from the opposed side walls 15 and 16 of the frame 12 by means of double acting shock absorbers with elastomeric rod ends, generally referenced 25. Any suitable double acting shock absorber with vibration isolation capabilities may be used in the practice of the present invention. The ends of the shock absorbers are connected to the frame and the mass by brackets 40 and 42 respectfully.

Figure 6:
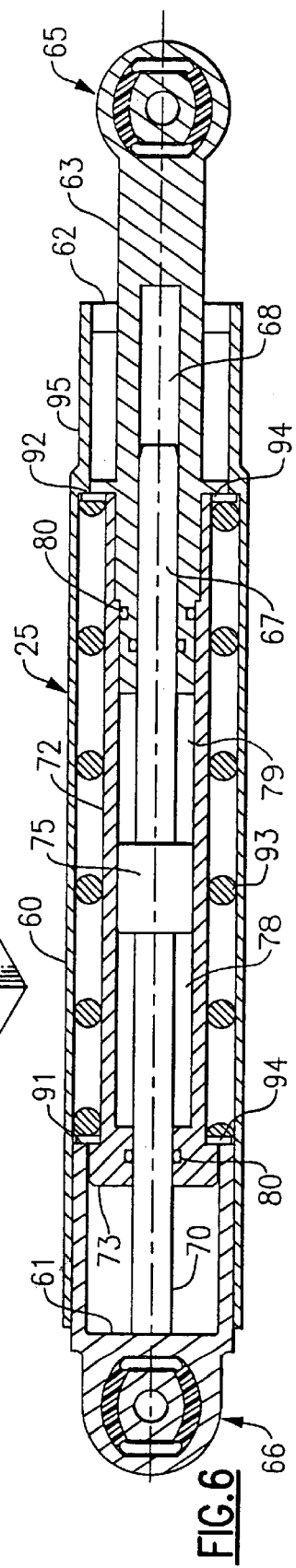
FIG. 6 is an enlarged sectional view taken along the central axis of a double acting shock and vibration absorber used in the present invention.

As illustrated in FIG. 6, each shock and vibration absorber 25 includes an outer cylinder 60 that is closed at one end by end wall 61 and at the other end by end wall 62. A piston rod 63 is slidably contained within the cylinder and passes outwardly through end wall 62 and terminates in a rod end 65. A similar rod end 66 is integrally joined to end wall 61 and the function of the connectors will be explained in greater detail below.

A shaft 67 is anchored at its proximal end in end wall 61 and extends axially toward the opposite end of the cylinder. The piston rod contains an axially aligned blind hole 68 in which the distal end 70 of the shaft is slidably contained. A shock tube 72 is mounted inside the outer cylinder also in axial alignment therewith. One end of the tube contains an enclosing wall 73 that is adopted to ride along the shaft on the proximal end of the shaft while the other end of the shock tube passes over piston rod 63 and is secured thereto by any suitable means so that the shock tubes reciprocate together along the axis of the cylinder.

A piston 75 is stationarily mounted upon the shaft 67 and is contained within the shock tube. The piston divides the interior of the tube into two separate chambers 78 and 79, both of which are filled with a hydraulic fluid such as silicone oil. The fluid can be orificed around the piston through a gap provided between the piston wall and the shock tube wall and thereby exchanged between the chambers in a well known manner as the shock tube is reciprocated along the shaft. Suitable seals 80—80 are provided to prevent the fluid from escaping from the shock tube. a compression spring 93 is wound about the shock tube and held in a loaded condition between the stops when the shock and vibration absorber is in a neutral position as illustrated in FIG. 6. Retaining rings 94—94 are placed between the stops which are adapted to engage the end wall 73 and a radially expanded flange 95 that is mounted upon the shock tube. Accordingly, the spring will be compressed when the shock and vibration absorber is placed under tension or compression. A shock and vibration absorber of this type is described in greater detail in U.S. Pat.No. 6,098,966, the disclosure of which is herein incorporate by reference.

Figure 7:
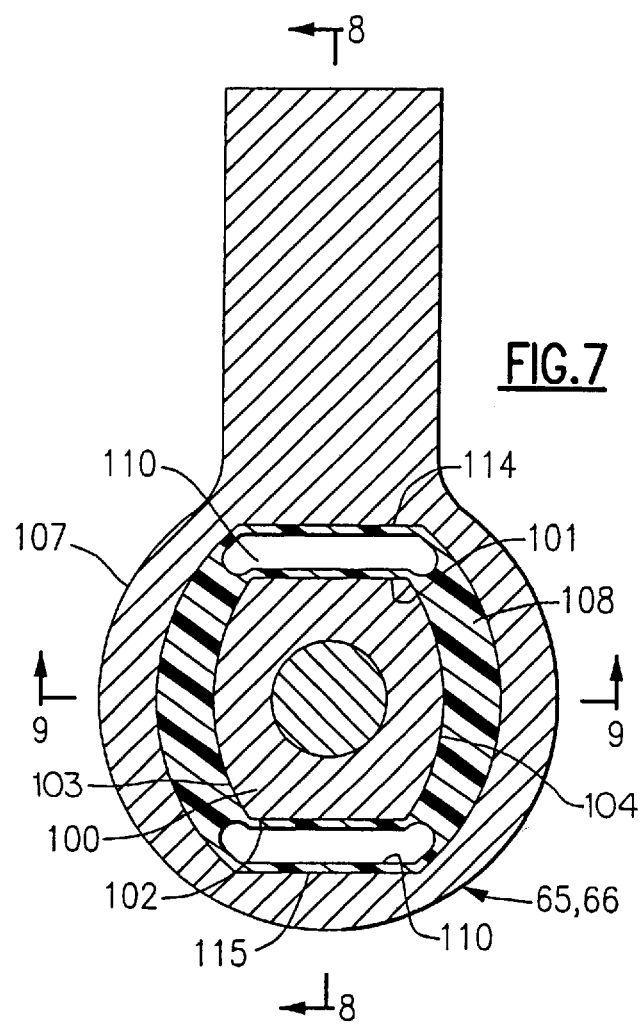
FIG. 7 is an enlarged partial sectional view of one of the end connectors employed by the double acting shock and vibration absorber.
Figure 8:
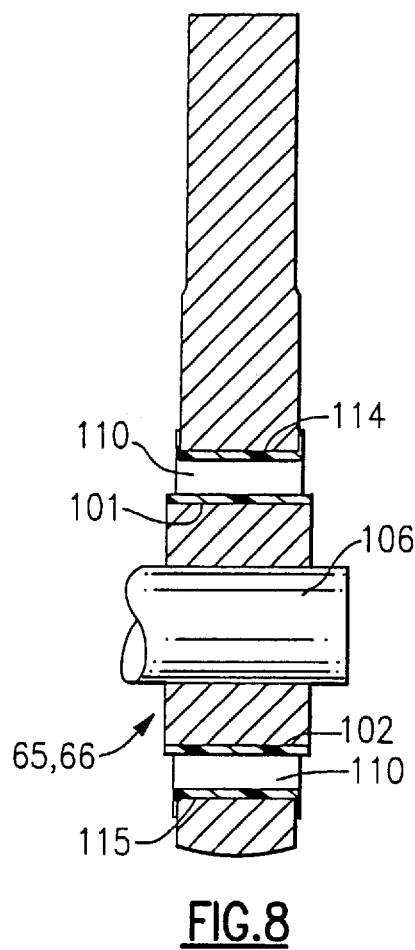
FIG. 8 is a side view, in section, of the connector.
Figure 9:
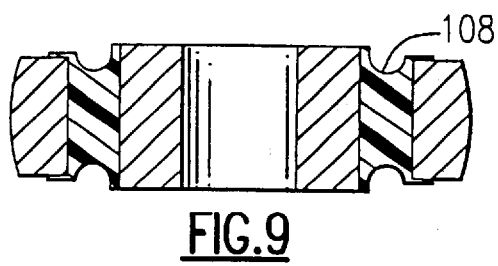
FIG. 9 is a view taken along line 9—9 in FIG. 7.

The connectors found at either end of the present absorber are illustrated in greater detail in FIGS. 7–9 and are described in the noted '966 patent. The end connectors are of similar construction and are designed to further attenuate shock and vibratory forces while allowing the ends of the absorber a certain amount of freedom to rotate in assembly. A metal collar 100 is press fitted to a pinion 106 that connects the ends of the absorber to the mass or the mass supporting structure. The collar contains flat top and bottom surfaces 101 and 102, respectively, and opposed circular side walls 103 and 104. An opening is contained in the bell section 107 of the connector that complements the shape of the collar. An open space is provided between the collar and the opening in the bell. The area within the opening is filled with an elastomeric shaped member, 108 that is designed to produce a linear or nonlinear response to vibrations below the break away preload of the shock and vibration absorber. Openings 110 in the elastomeric member adjacent the flat top and bottom surfaces of the collar to provide an air gap in the member so that the opposed flat surfaces 114 and 115 of the connector will come in contact with those on the collar when the break away force is reached so that higher forces will be transmitted directly to the absorber when the break away threshold is exceeded.

It should be evident the absorber mounting arrangement may be reversed from that shown without departing from the teachings of the present invention provided that the shock absorber is aligned to absorb shock forces and attenuate vibrations acting along the vertical axis of the frame. Preferably, the mass is suspended upon two or more shock absorbers which are mounted between the side walls of the mass and the adjacent side walls of the frame. More or less shock absorbers may be utilized depending upon the requirements of the specific system.

Figure 5:
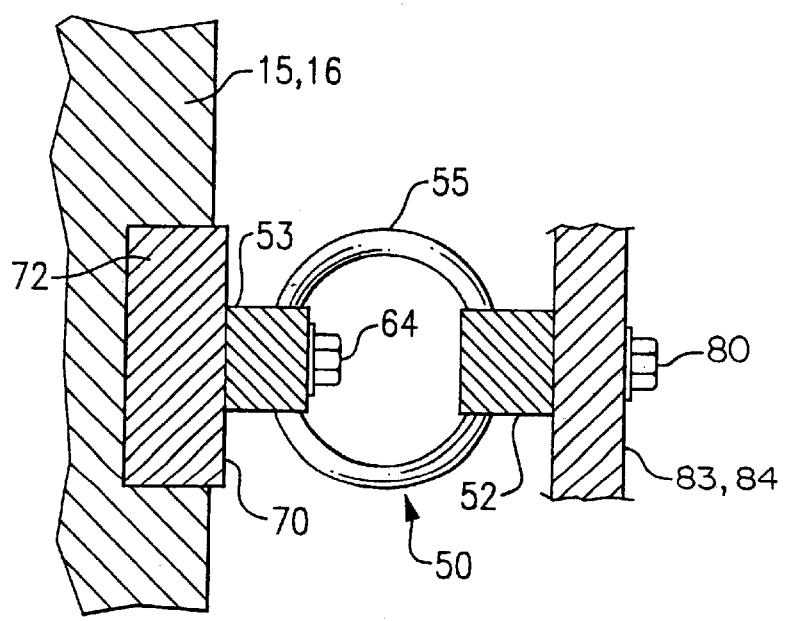
FIG. 5 is an enlarged sectional view taken along lines 5—5 in FIG. 2.
Figure 4:
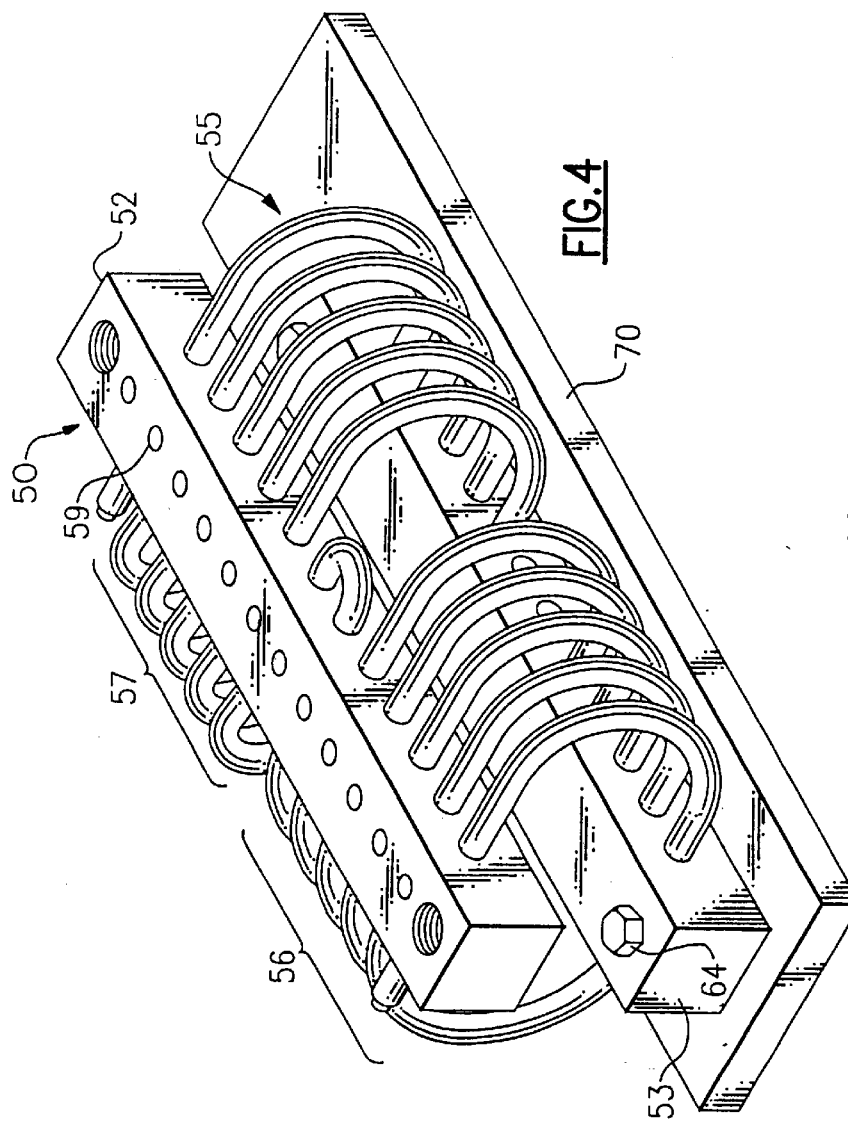
FIG. 4 is an enlarged view in perspective illustrating a wire rope isolator used in the practice of the present invention.

Wire rope isolators, generally referenced 50 are mounted between the side walls of the mass and the adjacent side walls 15 and 16 of the frame. As described in U.S. Pat. No. 5,549,285, the disclosure of which is hereby incorporated by reference, each wire rope isolator includes a pair of opposed mounting blocks 52 and 53 through which a wire rope 55 is threaded to form an opposed pair of spiral windings 56 and 57. The windings are secured to the mounting blocks by mechanically formed crimps 59 so that the mounting blocks are held in a spaced apart relationship by the windings. In assembly, one of the mounting blocks 52 is secured by bolts 82 in vertical alignment to an adjacent side wall 83–84 of the mass at each corner thereof. As illustrated in FIG. 5, the opposing mounting block 53 is secured by threaded fasteners 64 to a slide plate 70 that is slidably retained in a vertically disposed recess 72 formed in an adjacent frame side wall. As can be seen, this mounting arrangement permits each of the wire rope isolators to move freely with the mass in the vertical direction without deforming the spiral windings of the isolators. However, any shock or vibrations acting on the system along the horizontal or longitudinal axes of the system will cause the windings of the wire rope isolators to deform thereby attenuating the effect of the vibratory forces acting along these two axes. It is preferred to employ eight wire rope isolators in the practice of the present invention with one isolator being located at each sidewall comer of the mass. More or less isolators, however, may be utilized depending on the specific application, without departing from the present invention. By the same token, the slide member 70 may be replaced in certain applications by a simple lubricous plate upon which mounting block 53 can move in sliding contact when the mass is subjected to vibratory forces. The slide member 70 may be fixed to the sidewall 15, 16 in which case the spiral windings of the wire rope isolator will deform. This deformation will add to the shock and vibration capabilities of this system in the vertical direction.

As should be evident from the disclosure above, the present system employs only mechanical shock isolators to absorb and attenuate high shock and vibratory forces acting along three separate axes.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:
1. A multi-axes shock and vibration isolation system that includes a stationary frame member having intersecting horizontal, vertical, and longitudinal axes and a shock and vibration sensitive member housed within said frame member, a plurality of double acting shock absorbers, each of which contains a connecting means at opposite ends thereof for connecting one end of each shock absorber to the frame member and the opposite end of the shock absorber to the shock and vibration sensitive member, said double acting shock absorber being arranged to suspend the shock vibration sensitive member within the frame member to attenuate vibrations acting along said vertical axis, and a series of wire rope isolators acting between the members and being arranged to attenuate shock and vibrations acting along both said horizontal and said longitudinal axes.

2. The system of claim 1 wherein said connecting means include elastomeric rod ends for attenuating vibration in the vertical direction.

3. The system of claim 2 wherein each wire rope isolator contains a wire rope that is wound between opposed mounting blocks and wherein one mounting block is secured to one of said members and the opposite mounting block is mounted in sliding contact with the other of said members.

4. The system of claim 3 that further includes a series of lubricous surfaces against which said opposite mounting blocks of the wire rope isolators ride in sliding contact.

5. The system of claim 3 wherein each wire rope isolator includes a slide mounted within a vertically disposed groove formed in one of said members with said opposite mounting block of the isolator being secured to said slide.

6. The system of claim 1 wherein said frame member is rectangular in form and includes bottom and top walls and opposed side walls.

7. The system of claim 6 that includes further means for securing the bottom wall of said frame member to a stationary substrate.

8. The system of claim 7 wherein said shock and vibration sensitive member has opposed side walls that are adjacent to the side walls of the frame member and said double acting shock absorbers are mounted between the adjacent side walls of the members.

9. The system of claim 8 wherein a wire rope isolator is mounted between the opposed side walls of the members at each side wall corner of the shock and vibration sensitive member.

10. The system of claim 9 wherein a pair of double acting shock absorbers are connected between the adjacent side walls of the two members.

* * * * *